United States Patent [19]

Maxwell

[11] 4,335,547

[45] Jun. 22, 1982

[54] BALCONY GREENHOUSE

[76] Inventor: Westelle Maxwell, 18501 Hilliard Blvd., Rocky River, Ohio 44116

[21] Appl. No.: 161,044

[22] Filed: Jun. 19, 1980

[51] Int. Cl.³ .................... E04B 7/16; A01G 9/00
[52] U.S. Cl. .......................................... 52/66; 47/17; 47/40; 52/29; 52/36; 52/64
[58] Field of Search ................... 47/17, 40; 52/29, 36, 52/64, 66

[56] References Cited

U.S. PATENT DOCUMENTS

| | | | |
|---|---|---|---|
| 971,059 | 9/1910 | Lutz | 47/40 X |
| 1,142,539 | 6/1915 | Stahelin | 47/17 |
| 1,427,605 | 8/1922 | Lawson | 52/64 X |
| 2,857,197 | 10/1958 | Hogg | 52/64 X |
| 2,869,561 | 1/1959 | Harkness | |
| 3,148,479 | 9/1964 | D'Amato | 52/66 X |
| 3,324,593 | 6/1967 | Strasser | 47/17 X |
| 3,562,972 | 2/1971 | D'Amato | |
| 3,812,616 | 5/1974 | Koziol | 47/17 |
| 4,018,213 | 4/1977 | Mann, Jr. | 47/17 |
| 4,057,941 | 11/1977 | Schwartz | 52/63 |
| 4,068,421 | 1/1978 | Marovich | 52/80 |

FOREIGN PATENT DOCUMENTS

| | | | |
|---|---|---|---|
| 527813 | 6/1931 | Fed. Rep. of Germany | 47/17 |
| 255945 | 8/1926 | United Kingdom | 47/17 |

Primary Examiner—Alfred C. Perham
Attorney, Agent, or Firm—J. H. Slough

[57] ABSTRACT

A movable greenhouse construction adapted for use on a balcony or a patio having means for moving the greenhouse laterally parallel to the building wall containing a balcony door or patio door to permit direct access from the building to the interior of the greenhouse. After use, the movable greenhouse can be moved laterally out of the way to free the balcony or patio door for unobstructed access from the building to the balcony or patio and flush with the exterior of the building structure or closed balcony or patio door.

9 Claims, 9 Drawing Figures

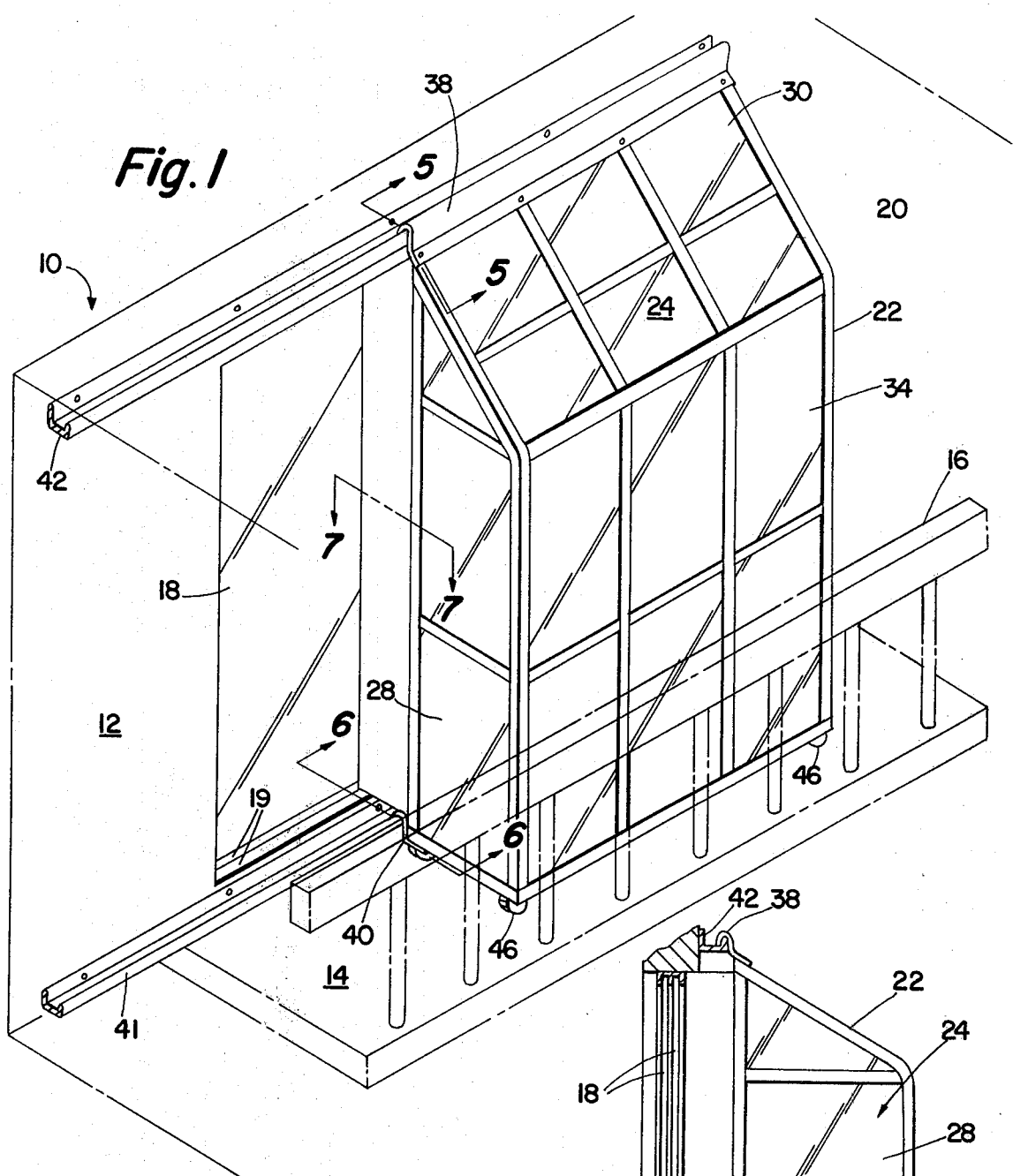
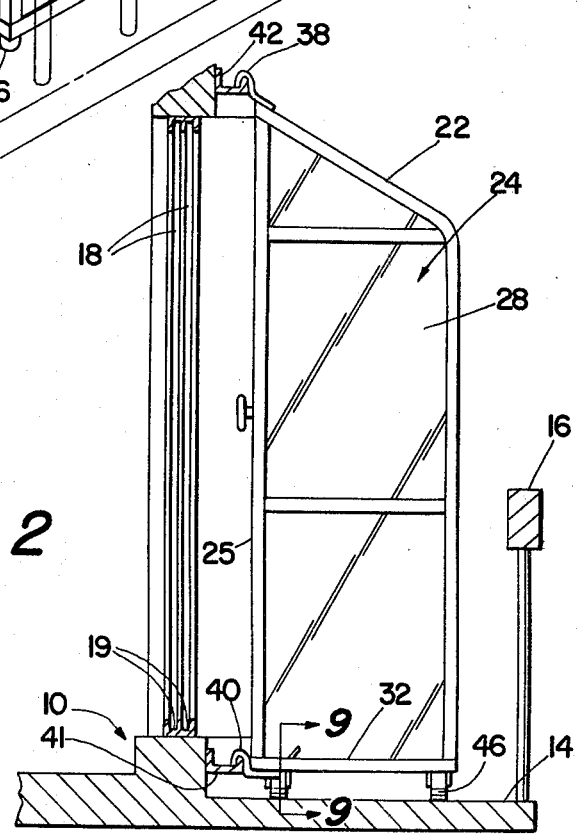

BALCONY GREENHOUSE

This invention pertains to a movable greenhouse and relates more particularly to a balcony or patio greenhouse or the like adapted to be laterally movable relative to the balcony or patio door whereby the movable greenhouse is easily accessible from inside the building through a balcony patio door or other building opening for maintenance, enjoyment or other use but is adapted to be moved laterally free of the balcony or patio door or other building opening during non-use.

Portable greenhouses are known as disclosed in U.S. Pat. No. 4,068,421 wherein a centrally supported half-dome greenhouse is secured to a patio floor adjacent to a patio door. In similar manner, U.S. Pat. No. 3,562,972 and U.S. Pat. No. 4,018,213 each disclose a lean-to type greenhouse adapted to be secured to a building wall. Free standing greenhouses are shown in U.S. Pat. Nos. 3,812,616; 2,869,561; and 4,057,941. However, such prior art greenhouses must be dismantled for displacement and are not adapted for lateral movement once the greenhouse is secured in place.

The present invention involves the construction of a freely movable greenhouse adapted for easy lateral sidewise movement on a balcony or patio floor, which greenhouse can be aligned with an opening in the building such as a building access door to a balcony or patio to provide direct access from inside the building to the interior of the greenhouse during use and working inside the greenhouse. Preferably the movable greenhouse includes supporting movement means such as a plurality of wheels or skids to provide lateral movement of the greenhouse in a direction parallel to the building wall. After use, the movable greenhouse can be maintained in said designated position for enjoyment by occupants of the adjacent room or can be easily moved laterally parallel to the building wall and away from the opening such as the balcony or patio door whereby the balcony or patio door is free and unobstructed for continuing use of the balcony or patio without interference from the greenhouse. These and other advantages of this invention will become more readily apparent by referring to the drawings and the detailed description of the invention.

An object of the invention is to provide a greenhouse for apartment or homeowners adapted to be positioned easily and selectively in two or more positions as desired for use and/or storage and to be made secured in any such adjusted position.

A further object of my invention is to provide a greenhouse structure which can be either artificially or solar selfheated.

Another object of my invention is to provide a greenhouse which is simple in construction, composed of but few parts, inexpensive to manufacture and efficient in use.

A still further object of my invention is to provide a greenhouse structure of the type set forth which will be adaptable to use with various greenhouse techniques.

Other objects of my invention and the invention itself will become more readily apparent by reference to the following description and drawings.

Briefly, the movable greenhouse comprises a glass, fiberglass or other opaque enclosure slidably engaging a building wall containing an access door opening to a balcony or a patio. The movable greenhouse includes supporting movement means such as a plurality of wheels or skids to provide lateral movement of the greenhouse in a direction parallel to the building wall. The greenhouse enclosure includes an opening in the forwardly facing section adjacent to the building wall and the greenhouse enclosure opening may be aligned with the building door opening to provide direct access to the interior of the greenhouse through the building opening as a balcony or patio door. During non-use, the greenhouse can be moved laterally sideways free of the balcony or patio door to permit unobstructed access to the balcony or patio from the building.

IN THE DRAWINGS

FIG. 1 is a perspective view of the movable greenhouse of this invention in use on a balcony and adjacently disposed to a balcony sliding door;

FIG. 2 is side view of the movable greenhouse in FIG. 1;

Figure 3:
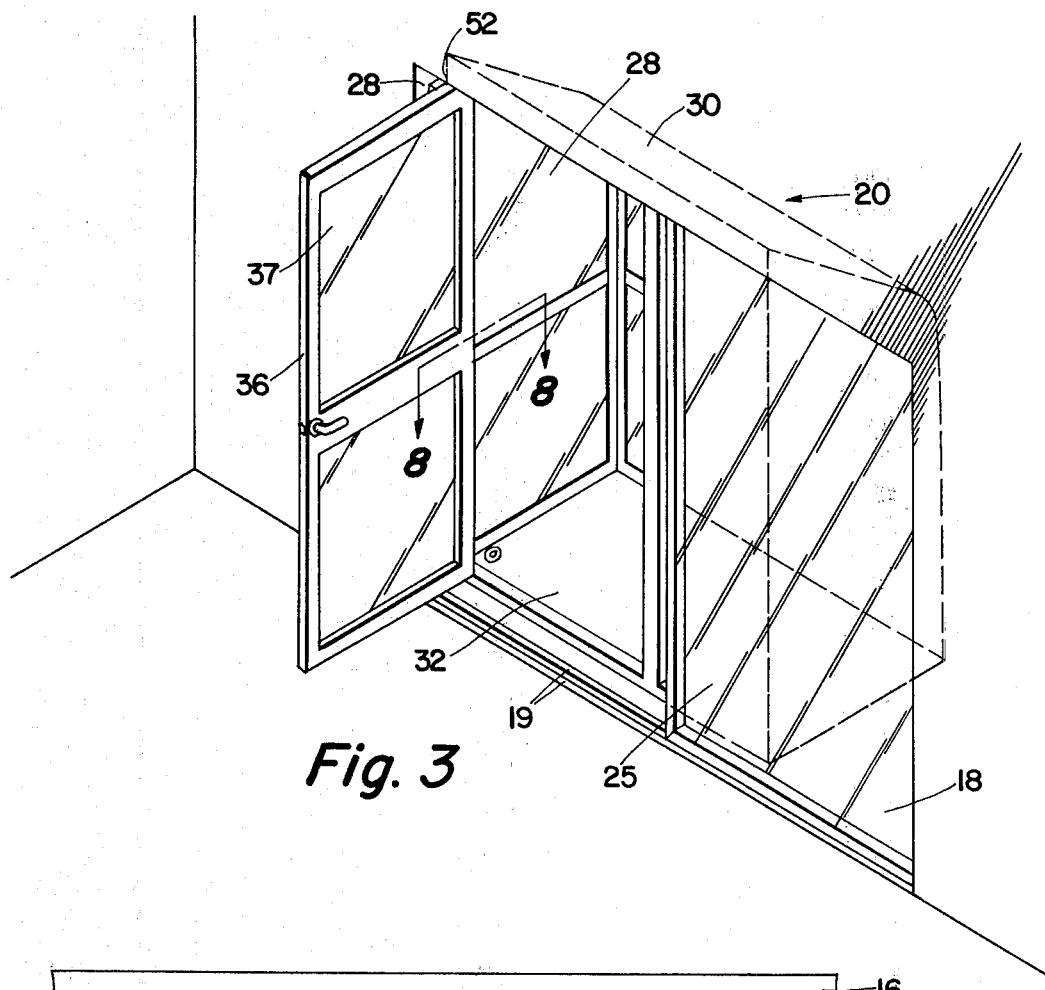
FIG. 3 is a perspective view of the movable greenhouse as viewed through the balcony sliding glass doors from inside the building.
Figure 4:
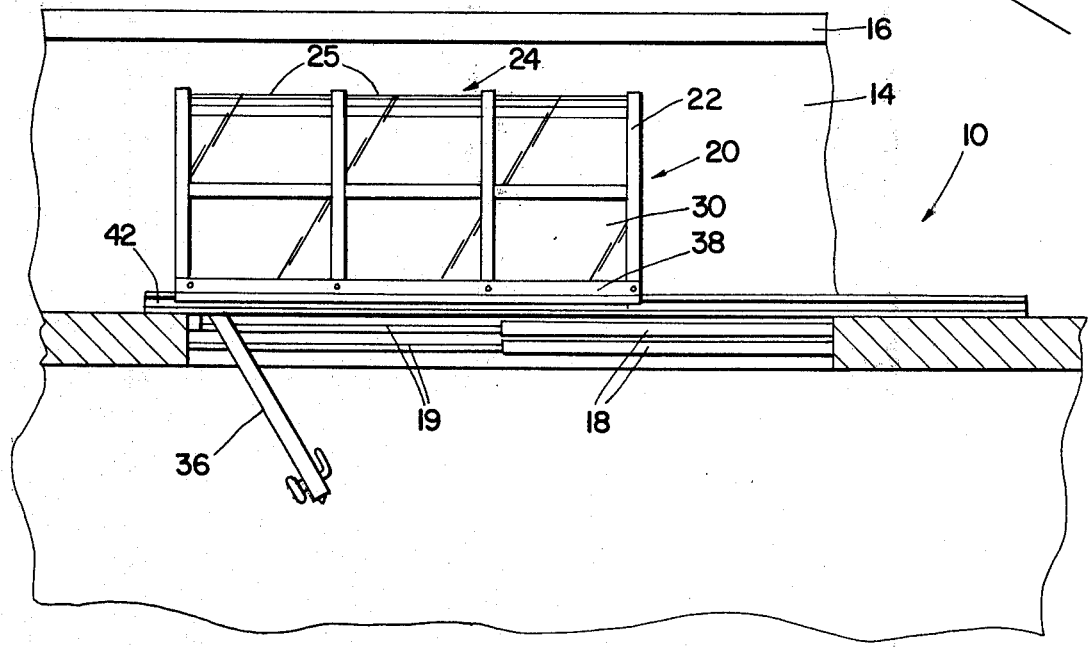
FIG. 4 is a top plan view of the movable greenhouse in FIG. 3 with the building wall shown in section.

Referring to the drawings wherein like numerals designate like parts, at 20 I show a movable greenhouse 20 disposed adjacent to an outside wall 12 of a bulding 10 having a balcony comprising a balcony floor 14 and a balcony railing 16. The movable greenhouse 20 is disposed inside the balcony and located adjacent to a pair of balcony sliding doors 18, 18 which provide access from inside the building 10 to the balcony. The balcony doors 18,18, slide normally in a pair of channels 19,19.

The movable greenhouse 20 comprises an open structural frame 22 provided with a plurality of glass panes 24, plexiglass, or other plastic sheets forming a greenhouse enclosure containing a front section 25, two side sections 28,28, a downwardly sloping top section 30, a wall section 34, and a greenhouse floor section 32. The greenhouse front wall section 25 includes an access door 36 containing glass or plastic panes 37. Thus, the front section 25 is adjacently disposed to and faces the patio glass doors 18,18.

Secured to the upper lateral edge portion of the sloping roof 30 located closest to the building wall 12 is an upper elongated slidable structural member 38 preferably of and shaped like an inverted U-form which slidably engages an upper horizontally disposed channel 42 securely bolted to the outside of the building wall 12 just above the balcony doors 18,18. In similar fashion, a lower elongated inverted U-member 40 slidably engages a lower channel 41 secured to the building wall 12 below the patio glass sliding doors 18,18. A plurality of wheels 46 are operatively attached to the greenhouse floor 32 to support the greenhouse enclosure 20 on the balcony floor 14 and provide easy lateral movement of the greenhouse 20 in a direction parallel to the outside of the building wall 12. The greenhouse side walls 28,28 can include side extension members 29,29 pivotally mounted to the side sections 28 at pivot connections 50 wherein the extension members 29,29 are adapted to tightly engage the outer sliding balcony door 18 and can further include resilient weatherstripping to provide slidable contact with the outer balcony door 18 and attendant channel 19, as well as the upper channel 42 and lower channel 44.

FIG. 3 is a rearward view of the movable greenhouse 20 as viewed from inside the building and through the open sliding balcony doors 18,18. The greenhouse door 36 is shown open and extending inwardly through the open balcony doorway. The balcony doors 18,18 are pushed fully open to the right to provide direct access from inside the building 10 through the greenhouse door 36 into the interior of the greenhouse enclosure 20.

Figure 5:
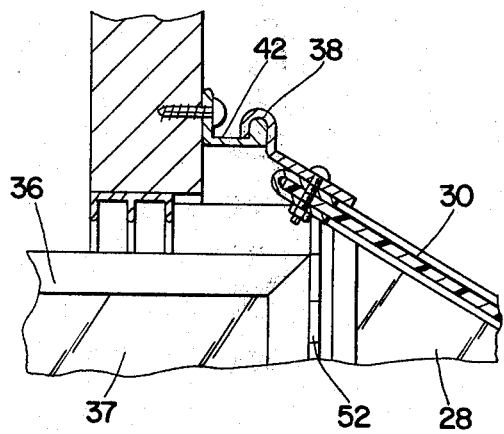
FIG. 5 is an enlarged section view taken along lines 5—5 in FIG. 1.
Figure 6:
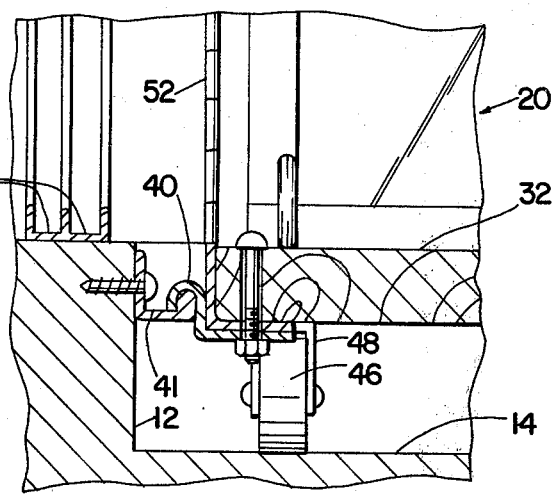
FIG. 6 is an enlarged section view taken along lines 6—6 in FIG. 1.

Referring now to FIG. 5, shown is an enlarged partial section view taken along lines 5—5 in FIG. 1 and showing in more detail the sliding engagement of the upper elongated structural member 38 with upper horizontally disposed channel 42 securely anchored to the building wall 12. Similarly, FIG. 6 is an enlarged partial section view taken along lines 6—6 in FIG. 1 and showing in greater detail the sliding engagement of the lower elongated structural member 40 with the lower channel 44 secured to the outside of the building wall 12. Further shown in FIG. 6 is one of the wheels 46 operatively attached to the greenhouse floor 32 by a mounting bracket 48 and resting on the balcony floor 14 to enable easy lateral movement with at least three other operating wheels adjacent the four corners of the greenhouse in a direction parallel with the outside of the building wall 12, the upper structural member 38 slidably moving within the upper channel 42 and the lower structural member 40 slidably moving within the lower channel 44 during movement of the plurality of wheels 46 facilitating easy lateral movement in a direction parallel to the outside building wall 12.

Figure 7:
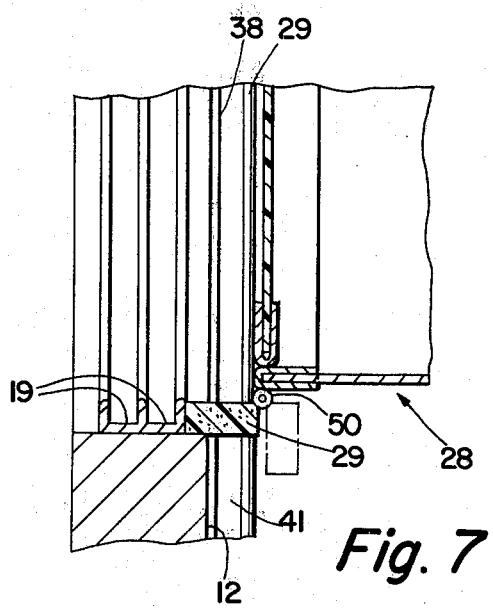
FIG. 7 is an enlarged section view taken along lines 7—7 in FIG. 1.
Figure 8:
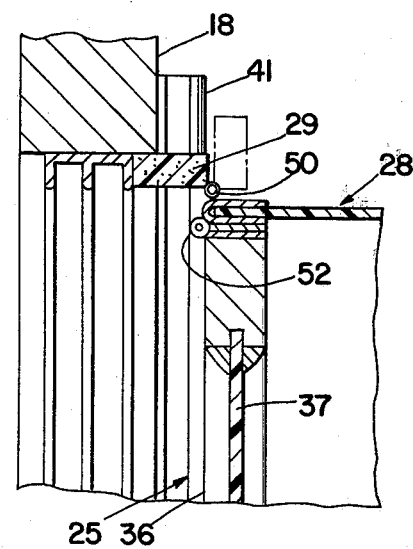
FIG. 8 is an enlarged section view taken along lines 8—8 in FIG. 3.

FIG. 7 is an enlarged partial section view taken along lines 7—7 in FIG. 1 looking downwardly and showing the pivotal connection 50 of the side extension member 29 with the greenhouse side section 28. FIG. 8 is a similar view taken along lines 8—8 in FIG. 3 showing the other side extension member 29 pivotally connected at 50 to the other side section 28. Further shown is the greenhouse door structure 36 containing glass 37 held within the door frame 36. The greenhouse access door 36 is pivotally mounted by hinges 52 to the greenhouse side section 28 to permit movement of the door 36 outwardly from the greenhouse 20 and inwardly through the open balcony doors 18,18, as best viewed in FIG. 3 when aligned therewith.

Figure 9:
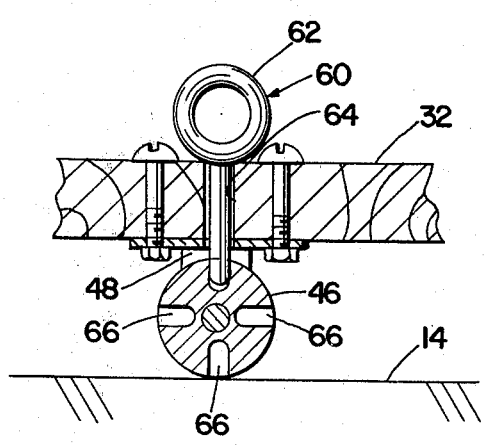
FIG. 9 is an enlarged section view taken along lines 9—9 in FIG. 2.

FIG. 9 shows a still further desirable feature of this invention, an enlarged sectional view taken along lines 9—9 in FIG. 2 better illustrating a locking means for preventing movement of the greenhouse 20. Shown is a wheel 46 having recesses 66 peripherally disposed about the outer surface of the wheel at spaced portions thereof, said wheel being disposed closest to the building wall 12 whereby the wheel 46 can be locked with a vertical drop lock-pin 60 having an upper circular finger grip 62 or by other suitable locking means. The lock-pin 60 is adapted to drop through an oversize vertical opening 64 in the greenhouse floor 32 to engage one of a plurality of recesses disposed radially into the wheel 46. In use, the lock-pin 60 can be removed to free the wheel 46 and permit lateral movement of the greenhouse 20, whereupon the lock-pin 60 can be reinserted through the vertical oversize opening 64 to once again engage one of the recesses 66 in the wheel 46. Any one of the wheels 46 can contain the foregoing locking means although the desirable wheel would be the wheel located nearest to the greenhouse access door 36; other locking means might further be employed.

The greenhouse 20 can be constructed of conventional materials such as structural aluminum or steel frame members and smaller cross members to secure the glass, plexiglass, fiberglass or other translucent inserts adapted to permit the sunlight to enter the greenhouse. The greenhouse roof 30 further contains glass inserts and should be sloping to permit rain and snow runoff. Weather stripping can be used on the rearward frame members engaging the balcony sliding doors to provide a resilient seal between the movable greenhouse and the balcony doors. As noted hereinbefore, the greenhouse section 34 adjacent the balcony doors 18,18 can comprise a wall 34 and an access door 36. Alternatively the greenhouse wall section 36 can be provided with an enlarged opening whereby the interior of the greenhouse can be freely accessible directly through the balcony door 18. The greenhouse 20 can be heated, ventilated, insulated and humidified in a conventional manner.

In use, the movable balcony or patio greenhouse 20 can be moved laterally sideways and located opposite to the balcony or patio doors which typically are a pair of sliding glass doors 18,18 adapted to slide open and provide direct access to the interior of greenhouse enclosure as best viewed in FIG. 3. The wheel 46 can be locked with the lock-pin 60 as shown in FIG. 9 to prevent movement of the greenhouse 20 while working inside the enclosure. Upon concluding work inside the greenhouse 20, the lock-pin 60 can be removed and if provided with a greenhouse door 36 said door can be closed, or if provided only with an opening, the entire greenhouse 20 can be moved laterally sideways away from the open balcony door 18 whereby the balcony is freely accessible through the open balcony door 18. The greenhouse can be locked by means of the lock-pin 60 to remain out of the way during normal use of the balcony or patio as the case may be until access to or viewing of the inside of the greenhouse enclosure 20 is desired, whereupon the procedure is reversed and the greenhouse 20 again moved laterally sideways to align the greenhouse access door 36 or greenhouse with the balcony door 18 open or closed.

The movable greenhouse of this invention is particularly adapted for use on an apartment or condominium balcony in conjunction with balcony sliding glass access door although the movable greenhouse can be simularly used on a patio in conjunction with patio sliding glass access doors. A particularly desirable aspect of this invention is that the movable greenhouse can be easily aligned with the balcony or patio access door or doors in use to provide direct entrance to the greenhouse enclosure. After work inside the greenhouse is finished, the greenhouse can, if desired, be easily moved laterally sideways out of the way and leave the major remaining portion of the balcony or patio free providing unobstructed ingress and egress to the building from the balcony or patio.

It is to be noted that various means may be associated with or in the greenhouse structure such as shelving, humidity trays, ventilating means i.e. louvre openings or fans, lighting means, such as heating means, e.g. wires impregnated in the fiberglass or solar heating pipes, or other means and that the foregoing description of the movable greenhouse is a preferred embodiment and is not intended to be limiting except as defined by the appended claims.

What I claim is:

1. A movable greenhouse for use in conjunction with an outside vertical wall of a building having a transparent access opening providing access and view to a walk area outside the building adjacent to the building access opening, the greenhouse comprising:

a greenhouse enclosure having front, side and rear walls adapted to transmit light and heat to the interior thereof and to afford a view therethrough and through said access opening, said greenhouse having a forward section adapted to be disposed adjacent to said building wall having said opening, said greenhouse section having an access opening adapted to be approximately aligned with said building access opening to provide direct access from said building opening to the interior of said greenhouse enclosure; said greenhouse enclosure having an upper slidable structural member, said upper slidable structural member engaging a horizontally disposed lateral channel secured to said building wall above said bulding access opening whereby said structural member and said channel interact in sliding engagement to permit lateral movement of said greenhouse in a direction parallel to said building wall; said greenhouse enclosure having a plurality of wheels operatively connected to a bottom portion of said greenhouse and supporting said greenhouse on said horizontally disposed walk area adjacent to said building access opening to facilitate lateral movement of said greenhouse;

said greenhouse enclosure being movable in a lateral direction parallel with said building wall whereby said greenhouse enclosure can be moved laterally sideways to free said building access opening and provide unobstructed access from said building to said walk area.

2. The movable greenhouse in claim 1 wherein said walk area is a balcony floor.

3. The movable greenhouse in claim 1 wherein said walk area is a patio floor.

4. The movable greenhouse in claim 1 wherein the lower portion of said greenhouse includes a lower slidable structural member disposed adjacently to said building wall and slidably engages a lower channel secured to said building wall below said building access door to provide lateral directional movement of said greenhouse in a direction parallel to said building wall.

5. The movable greenhouse in claim 1 wherein the access opening in the greenhouse is a doorway.

6. The movable greenhouse in claim 5 wherein a greenhouse door opens inwardly through the building access door.

7. The movable greenhouse in claim 1 wherein the greenhouse has a locking means for locking movement of at least one of said wheels to prevent lateral movement of said greenhouse.

8. The movable greenhouse in claim 7 wherein said wheel locking means comprises a drop-pin for engaging a radially directed recess in said wheel.

9. A movable greenhouse for use in conjunction with an outside vertical wall of a building having an access opening providing access to a walk area outside the building adjacent to the building access opening, the greenhouse comprising:

a greenhouse enclosure adapted to be disposed adjacent to said building wall having said opening, said greenhouse having an access opening adapted to be approximately aligned with said building access opening to provide direct access from said building opening to the interior of said greenhouse enclosure; said greenhouse enclosure having an upper slidable structural member, said upper slidable structural member engaging a horizontally disposed lateral channel secured to said building wall whereby said structural member and said channel interact in sliding engagement to permit lateral movement of said greenhouse in a direction parallel to said building wall; said greenhouse enclosure having movable means operatively connected to a bottom portion of said greenhouse and supporting said greenhouse on said horizontally disposed walk area adjacent to said building access opening to facilitate lateral movement of said greenhouse;

said greenhouse enclosure being movable in a lateral direction parallel with said building wall whereby said greenhouse enclosure can be moved laterally sideways to free said building access opening and provide unobstructed access from said building to said walk area.

* * * * *